(12) United States Patent
Wang

(10) Patent No.: US 9,362,668 B2
(45) Date of Patent: Jun. 7, 2016

(54) CONNECTION DEVICE WITH FLOATING CONNECTOR

(71) Applicant: Getac Technology Corporation, Hsinchu County (TW)

(72) Inventor: Chen-Ping Wang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 65 days.

(21) Appl. No.: 14/581,502

(22) Filed: Dec. 23, 2014

(65) Prior Publication Data

US 2015/0333445 A1    Nov. 19, 2015

(30) Foreign Application Priority Data

May 13, 2014    (CN) .......................... 2014 1 0200782

(51) Int. Cl.
| | |
|---|---|
| *H01R 13/64* | (2006.01) |
| *H01R 13/631* | (2006.01) |
| *H01R 13/44* | (2006.01) |
| *H01R 12/91* | (2011.01) |
| *H01R 12/70* | (2011.01) |

(52) U.S. Cl.
CPC ........ *H01R 13/6315* (2013.01); *H01R 12/7094* (2013.01); *H01R 12/91* (2013.01); *H01R 13/44* (2013.01); *H01R 12/7082* (2013.01); *H01R 2201/06* (2013.01)

(58) Field of Classification Search
CPC .... H01R 12/91; H01R 13/6315; H01R 11/30; H01R 13/6205

USPC .................. 439/247, 38, 39, 40, 66
See application file for complete search history.

(56) References Cited

U.S. PATENT DOCUMENTS

| | | | | | |
|---|---|---|---|---|---|
| 4,118,090 | A | * | 10/1978 | Del Mei ............. | H01R 13/2414 439/374 |
| 7,066,751 | B2 | * | 6/2006 | Chen ................... | H01R 13/2442 439/247 |
| 2004/0214463 | A1 | * | 10/2004 | Chen ................... | H01R 13/2442 439/247 |
| 2015/0288091 | A1 | * | 10/2015 | Wang ................... | H01R 31/06 439/587 |

* cited by examiner

*Primary Examiner* — Hae Moon Hyeon
(74) *Attorney, Agent, or Firm* — Locke Lord LLP; Tim Tingkang Xia, Esq.

(57) ABSTRACT

Provided is a connection device with a floating connector, which includes a casing, a floating connector and a connecting element. The casing has an opening. The floating connector is disposed at the opening. Two sides of the floating connector are connected to the casing. The connecting element is disposed in the casing and positioned beside the opening. The floating connector includes a body, a first port and a guiding element. The connecting element includes a second port and a blocking element. The guiding element operates in conjunction with the blocking element of the connecting element. Hence, when the floating connector is not in use, the non-power-on first port of the floating connector is exposed from the casing. Therefore, even if the connection device is operating in a humid environment, it will not be susceptible to short circuit or electrolysis.

10 Claims, 5 Drawing Sheets

CONNECTION DEVICE WITH FLOATING CONNECTOR

CROSS-REFERENCE TO RELATED APPLICATIONS

This non-provisional application claims priority under 35 U.S.C. §119(a) on Patent Application No(s). 201410200782.3 filed in China on May 13, 2014, the entire contents of which are hereby incorporated by reference.

BACKGROUND OF THE INVENTION

1. Field of the Invention

The present invention relates to connection device, and more particularly, to a connection device with a floating connector.

2. Description of the Prior Art

Due to ever-changing technological advancements, portable devices, such as notebook computers and tablet computers, are in wide use in daily life. In general, the aforesaid portable devices each require an exposed connector for serving as a means of electrical connection with the other electronic devices. Hence, even when it is not in use, the connector is still in a power-on state. As a result, the portable devices operating in a humid environment are susceptible to problems as follows: short circuit, and electrolysis at the terminal of the connector.

SUMMARY OF THE INVENTION

It is an objective of the present invention to provide a connection device with a floating connector, such that the connection device manifests switchability because of the floating structure.

Another objective of the present invention is to provide a connection device with a floating connector, characterized by improved connection and engagement structure of the floating connector.

Yet another objective of the present invention is to provide a connection device with a floating connector, characterized in that the connecting element is waterproof.

In order to achieve the above and other objectives and advantages, the present invention provides a connection device with a floating connector. The connection device with a floating connector comprises a casing, a floating connector and a connecting element. The casing has an opening. The floating connector is positioned at the opening. The floating connector comprises a body, a first port and a guiding element. The body is disposed at the opening through a resilient element. The first port is penetratingly disposed at the body. The guiding element is pivotally disposed at a bottom surface of the body. The connecting element is disposed in the casing and positioned beside the opening. The connecting element comprises a second port and a blocking element. The second port is disposed on a top surface of the connecting element and corresponds in position to the first port. The blocking element is disposed on the top surface of the connecting element and corresponds in position to a first end of the guiding element. A stopping element disposed at a second end of the guiding element prevents the first port from electrically connecting with the second port when the first end of the guiding element abuts against the top surface of the blocking element.

According to the present invention, the connection device with a floating connector further comprises an electronic device which includes a third port and a magnetic element. The magnetic element is disposed beside the third port, wherein the third port corresponds in position to the first port. When the electronic device approaches the floating connector and causes the third port to electrically connect with the first port, the magnetic element is attracted to the guiding element, and thus the first end of the guiding element moves away from the blocking element, thereby allowing the first port to electrically connect with the second port.

Accordingly, the present invention is advantageously characterized in that the guiding element of the floating connector operates in conjunction with the blocking element of the connecting element to effectuate electrical connection or open circuit. Hence, when the floating connector is not in use, the non-power-on first port of the floating connector is exposed from the casing. Therefore, even if the connection device is operating in a humid environment, it will not be susceptible to short circuit or electrolysis. Furthermore, the connection device with a floating connector is characterized in that: a resilient element is annularly disposed between the casing and a body of the floating connector to render the connecting element waterproof; and a magnetic element disposed at the electronic device not only enables the floating connector to get connected by magnetic attraction, but the magnetic attraction is also conducive to the elimination of interference between the guiding element and the blocking element, such that the first port gets electrically connected to the second port as soon as the electronic device approaches the floating connector.

BRIEF DESCRIPTION OF THE DRAWINGS

To enable persons skilled in the art to fully understand the features and advantages of the present invention, the present invention is hereunder illustrated with preferred embodiments in conjunction with the accompanying drawings, in which.

DETAILED DESCRIPTION OF THE EMBODIMENTS

Figure 1:
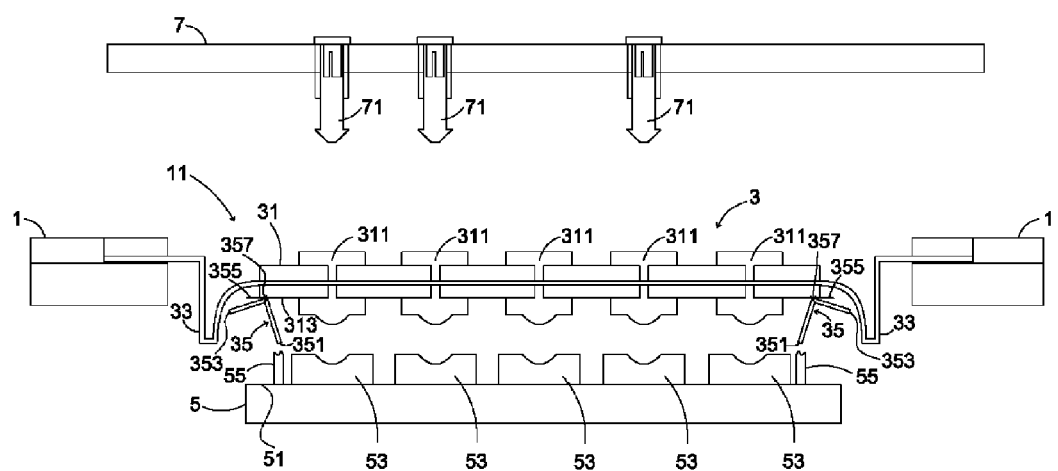
FIG. 1 is a structural schematic view of a connection device with a floating connector according to the first embodiment of the present invention.

Referring to FIG. 1, there is shown a structural schematic view of a connection device with a floating connector according to the first embodiment of the present invention. As shown in the diagram, in the first embodiment of the present invention, the connection device with a floating connector comprises a casing 1, a floating connector 3 and a connecting element 5. The casing 1 has an opening 11. The floating connector 3 is positioned at the opening 11. The floating connector 3 is fixed to the opening 11 through a resilient element 33. The connecting element 5 is disposed in the casing 1 and positioned beside the opening 11.

The floating connector 3 comprises a body 31, a first port 311, and a guiding element 35. The resilient element 33 is annularly disposed between the casing 1 and the body 31. The resilient element 33 is preferably made of a polymer, including a rubber, such that the resilient element 33 is waterproof. The first port 311 is penetratingly disposed at the body 31. The guiding element 35 is pivotally disposed at a bottom surface 313 of the body 311. The guiding element 35 is preferably made of a metal.

Figure 2:
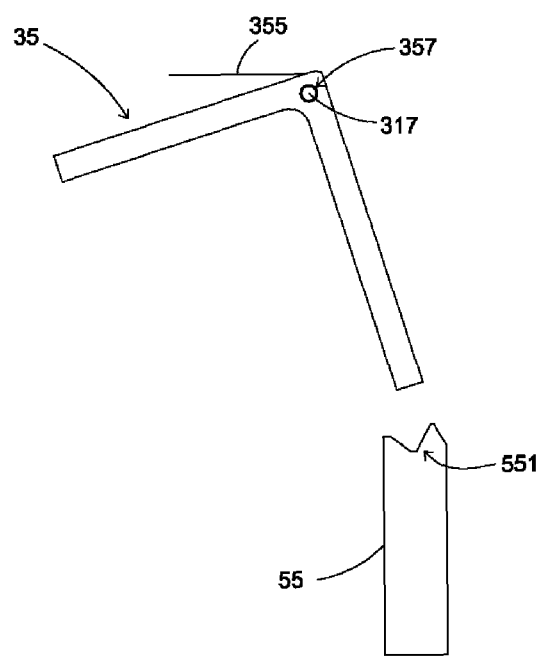
FIG. 2 is a structural schematic view of a guiding element of the connection device with a floating connector according to the first embodiment of the present invention.

Referring to FIG. 2, there is shown a structural schematic view of a guiding element of the connection device with a floating connector according to the first embodiment of the present invention. As shown in the diagram, the guiding element 35 has a first end 351 and a second end 353, wherein the guiding element 35 abuts against the blocking element 55 through the first end 351. The guiding element 35 has a stopping element 355. The stopping element 355 not only prevents the second end 353 of the guiding element 35 from coming into direct contact with the body 31, but also enables the first end 351 of the guiding element 35 to stay above the blocking element 55. A pin hole 357 is disposed at the junction of the first end 351 and the second end 353 of the guiding element 35. A pin 317 is pivotally disposed at the body 31 by means of stamping or welding and corresponds in position to the pin hole 357, such that the guiding element 35 is pivotally disposed at the floating connector 3.

The connecting element 5 is disposed in the casing 1 and positioned beside the opening 11. The connecting element 5 comprises a second port 53 and a blocking element 55. The second port 53 is disposed on atop surface 51 of the connecting element 5 and corresponds in position to the first port 311. The blocking element 55 is disposed on the top surface 51 and corresponds in position to the first end 351 of the guiding element 35. A guide notch 551 is disposed at the top of the blocking element 55. The guide notch 551 corresponds in position to the first end 351 of the guiding element 35.

In the first embodiment of the present invention, the connection device with a floating connector further comprises an electronic device 7. The electronic device 7 comprises a third port 71. The third port 71 corresponds in position to the first port 311. The third port 71 is preferably a spring connector. The third port 71 and the first port 311 get electrically connected to each other, as soon as the electronic device 7 comes into contact with the floating connector 3.

Figure 3:
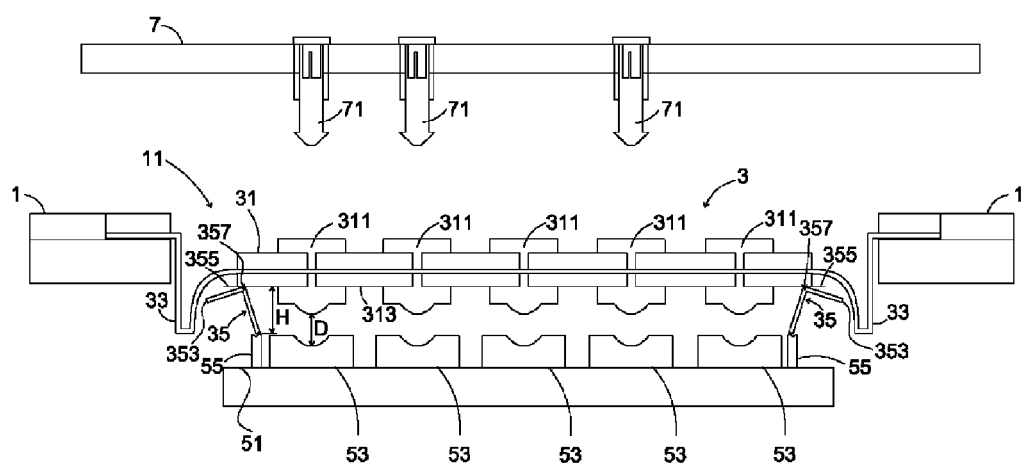
FIG. 3 is an operational schematic view of the connection device with a floating connector according to the first embodiment of the present invention.

Referring to FIG. 3, there is shown an operational schematic view of the connection device with a floating connector according to the first embodiment of the present invention. As shown in the diagram, when the electronic device 7 comes into contact with the floating connector 3, the first end 351 of the guiding element 35 of the floating connector 3 and the top surface of the blocking element 55 of the connecting element 5 abut against each other because of the stopping element 355, such that the first port 311 is not electrically connected to the second port 53. Hence, when the first end 351 abuts against the top surface of the blocking element 55 of the connecting element 5, the first end 351 of the guiding element 35 is separated from the bottom surface 313 of the body 31 by a height H along the normal vector of the body 31. The height H is not less than a distance D between the first port 311 and the second port 53 along the normal vector of the body 31. Therefore, the second port 53 corresponding in position to the first port 311 abuts against the guiding element 35 having the stopping element 355, such that the floating connector 3 and the connecting element 5 are prevented from electrically connecting to each other.

Hence, in the first embodiment of the present invention, given the guiding element 35 disposed on the floating connector 3 and the blocking element 55 of the connecting element 5, the floating connector 3 is not electrically connected to the connecting element 5 when the electronic device 7 comes into contact with the floating connector 3, such that the non-power-on first port 311 of the floating connector 3 is exposed from the casing 1. Therefore, even if the connection device of the present invention is operating in a humid environment, it will not be susceptible to short circuit or electrolysis.

Figure 4:
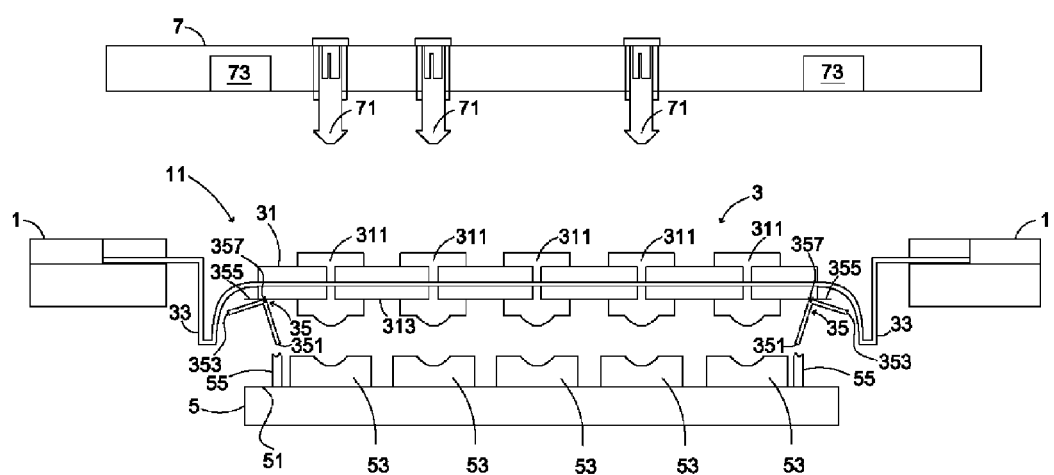
FIG. 4 is a structural schematic view of the connection device with a floating connector according to the second embodiment of the present invention.

Referring to FIG. 4, there is shown a structural schematic view of the connection device with a floating connector according to the second embodiment of the present invention. As shown in the diagram, the second embodiment is similar to the first embodiment in structure and thus is not described in detail herein for the sake of brevity, except that a magnetic element 73 of the electronic device 7 in the second embodiment and its operation are described below.

The magnetic attraction between the magnetic element 73 and the guiding element 35 depends on the distance therebetween. When the magnetic element 73 has not yet approached the guiding element 35, the first end 353 causes the guiding element 35 to be positioned on the top surface of the blocking element 55 because of the resilience developed by the stopping element 355 abutting against the body 31 laterally; hence, even if the floating connector 3 is pressed upon, there will be interference between the guiding element 35 and the stopping element 355. When the magnetic element 73 approaches the stopping element 355, the magnetic attraction between the magnetic element 73 and the stopping element 355 is adjusted by the distance therebetween to render the magnetic attraction larger than or equal to the resilience of the stopping element 355; as a result, the second end 353 of the guiding element 35 presses against the stopping element 355 of the guiding element 35 and thus gets close to the body 31 laterally, and at this point in time there is no interference between the guiding element 35 and the stopping element 355.

Figure 5A:
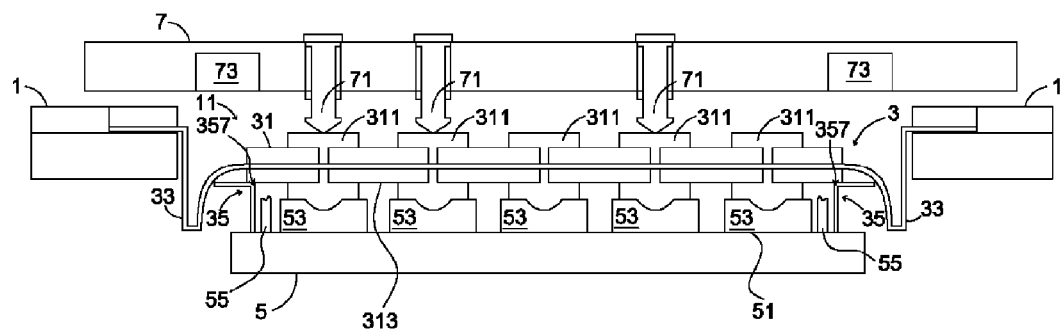
FIG. 5A is an operational schematic view of the connection device with a floating connector according to the second embodiment of the present invention.
Figure 5B:
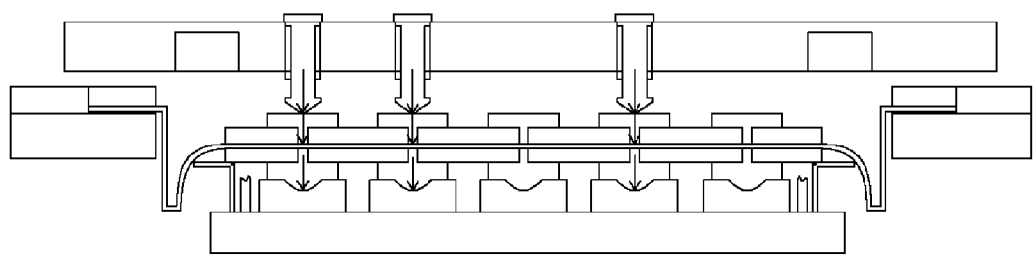
FIG. 5B is a schematic view of the electrical connection of the connection device with a floating connector according to the second embodiment of the present invention.

Referring to FIG. 5A and FIG. 5B, there are shown an operational schematic view and an electrical connection schematic view of the connection device with a floating connector according to the second embodiment of the present invention. As shown in the diagrams, the magnetic element 73 is disposed beside the third port 71. When the electronic device 7 approaches the floating connector 3 and causes the third port 71 to electrically connect with the first port 311, the magnetic element 73 attracts the guiding element 35, and thus the first end 351 of the guiding element 35 moves away from the blocking element 55, thereby allowing the first port 31 to electrically connect with the second port 53.

Therefore, the second embodiment is characterized in that, not only does the magnetic element 73 enable the floating connector 3 to get connected by magnetic attraction, but the magnetic attraction is also conducive to the elimination of interference between the guiding element 35 and the blocking element 53, such that the first port 311 gets electrically connected to the second port 53 as soon as the electronic device 7 approaches the floating connector 3.

In conclusion, the present invention provides a connection device with a floating connector. The connection device with a floating connector comprises a casing, the floating connector, and a connecting element. The casing has an opening. The floating connector is disposed at the opening. The connecting element is disposed in the casing and positioned beside the opening. The connection device with a floating connector is characterized in that, due to a guiding element of the floating connector and a blocking element of the connecting element, even if an electronic device comes into contact with the floating connector, the floating connector will not get electrically connected to the connecting element, but a non-power-on first port of the floating connector will be exposed from the casing. Hence, even if the connection device is operating at a humid environment, it will not be susceptible to short circuit or electrolysis, thereby improving the connection and engagement structure of the floating connector. Furthermore, the connection device with a floating connector is characterized in that: a resilient element is annularly disposed between the casing and a body of the floating connector to render the connecting element waterproof; and a magnetic element disposed laterally at the electronic device not only enables the floating connector to get connected by magnetic attraction, but the magnetic attraction is also conducive to the elimination of interference between the guiding element and the blocking element, such that the first port gets electrically connected to the second port as soon as the electronic device approaches the floating connector. Therefore, the floating structure of the present invention is switchable.

Therefore, the present invention has novelty, non-obviousness, and high industrial applicability and thus meets patentability requirements.

The above description relates to just a preferred embodiment of the present invention and is not restrictive of the present invention. Hence, equivalent variations and modifications made to the preferred embodiment of the present invention in accordance with the shapes, structures, features, and spirit recited in the claims of the present invention must be interpreted as falling within the claims of the present invention.

What is claimed is:

1. A connection device with a floating connector, comprising:
   a casing having an opening;
   a floating connector disposed at the opening, the floating connector including a body, a first port and a guiding element, the body being disposed at the opening through a resilient element, the first port being penetratingly disposed at the body, and the guiding element being pivotally disposed at a bottom surface of the body; and
   a connecting element disposed in the casing and positioned beside the opening, the connecting element including a second port and a blocking element, the second port being disposed on a top surface of the connecting element and corresponding in position to the first port, and the blocking element being disposed on the top surface of the connecting element and corresponding in position to a first end of the guiding element,
   wherein a stopping element is disposed at a second end of the guiding element to prevent the first port from electrically connecting with the second port when the first end of the guiding element abuts against a top surface of the blocking element.

2. The connection device with a floating connector of claim 1, further comprising:
   an electronic device including a third port and a magnetic element positioned beside the third port,
   wherein, when the electronic device approaches the floating connector and causes the third port to electrically connect with the first port, the magnetic element attracts the guiding element, and thus the first end of the guiding element moves away from the blocking element, thereby allowing the first port to electrically connect with the second port.

3. The connection device with a floating connector of claim 2, wherein the third port is a spring connector.

4. The connection device with a floating connector of claim 1, wherein the guiding element has a pin hole whereby the guiding element is pivotally disposed at the floating connector.

5. The connection device with a floating connector of claim 4, wherein a pin is formed at the floating connector laterally by one of stamping and welding, and the pin corresponds in position to the pin hole.

6. The connection device with a floating connector of claim 1, wherein the guiding element is made of a metal.

7. The connection device with a floating connector of claim 1, wherein the blocking element has a guide notch disposed at a top of the blocking element and corresponding in position to the first end of the guiding element.

8. The connection device with a floating connector of claim 1, wherein, when the first end abuts against the top surface of the blocking element of the connecting element, the first end of the guiding element is separated from the bottom surface of the body by a height along a normal vector of the body, and the height is not less than a distance between the first port and the second port along the normal vector of the body.

9. The connection device with a floating connector of claim 1, wherein the resilient element is made of a polymer, including a rubber.

10. The connection device with a floating connector of claim 1, wherein the resilient element is annularly disposed between the casing and the body.

* * * * *